May 9, 1950 LE ROY A. QUAYLE 2,507,269
DISPENSING APPARATUS

Filed April 26, 1944 4 Sheets-Sheet 1

INVENTOR.
LE ROY A. QUAYLE
BY
Kwis Hudson Boughton & Williams
ATTORNEYS

May 9, 1950  LE ROY A. QUAYLE  2,507,269
DISPENSING APPARATUS
Filed April 26, 1944  4 Sheets-Sheet 3

Fig. 4

INVENTOR.
LEROY A. QUAYLE
BY
Kwis Hudson Boughton & Williams
ATTORNEYS

Patented May 9, 1950

2,507,269

UNITED STATES PATENT OFFICE 2,507,269

DISPENSING APPARATUS

Le Roy A. Quayle, Carbondale, Ill., assignor to The Sherwin-Williams Co., Cleveland, Ohio, a corporation of Ohio Application April 26, 1944, Serial No. 532,754

14 Claims. (Cl. 222—424)

This invention relates to the dispensing of liquids and aims to provide novel dispensing apparatus with which the charging of predetermined quantities of liquid into containers can be carried out in a rapid and satisfactory manner.

Another object of this invention is to provide a novel form of dispensing apparatus having a dispensing chamber and one or more measuring cups and wherein liquid is caused to flow into the dispensing chamber for filling the measuring cup or cups.

Still another object of the invention is to provide novel dispensing apparatus of this character, in which the dispensing chamber is connected with a reservoir so that the creation of a pressure differential therebetween causes liquid to flow into the chamber in excess of that required to fill a measuring cup, and wherein a retarded restoration of normal pressure controls the return of the excess liquid to the reservoir.

A further object of the present invention is to provide novel dispensing apparatus, of the character mentioned, in which the reservoir and dispensing chamber are both closed to atmosphere and contain an inert gas, and the creation of a pressure differential causes the desired flow of liquid into the dispensing chamber for filling one or more measuring cups.

The invention can be further briefly summarized as consisting in certain novel combinations and arrangements of parts hereinafter described and particularly set out in the appended claims.

The dispensing apparatus of the present invention can be used for dispensing measured quantities of various kinds of liquids and is especially suitable for charging or filling containers with predetermined quantities of the desired liquid. In the embodiment of the invention shown in Figs. 1 to 4 inclusive, my dispensing apparatus is being used for filling shells 10 or the like with an explosive while in a liquid or fluid form, for example, TNT. In the embodiment illustrated in Figs. 5 and 6 my dispensing apparatus is being used to fill cans 12 or the like with paint, lacquer, or other coating material.

In the form of the invention illustrated in Figs. 1 to 4 inclusive I show a housing or tank 13 having therein a reservoir 14, adapted to contain a supply of the liquid 15 to be dispensed, and a dispensing chamber 16 to which liquid is intermittently supplied from the reservoir for filling a measuring cup 17 or preferably one or more rows of such measuring cups. The tank 13 is supported in spaced relation above the floor 18 by a suitable frame 19 so that the containers to be filled can be placed beneath the dispensing chamber 16 to receive the measured quantities of liquid from the measuring cups 17. The containers 10 are carried by a suitable support, preferably a movable support such as the wheeled truck 20, which can be moved or advanced beneath the dispensing chamber 16 with a step-by-step movement to bring successive rows or groups of the containers beneath the row of measuring cups 17. The containers of each row correspond in number and spacing with the measuring cups 17 and may be held in this relation by a suitable rack 21 which is carried by the truck 20 and in which the containers are placed.

As shown in the drawings, the dispensing chamber 16 has an inlet 23 which is connected with the reservoir 15 at a point below the lowest level of the liquid in the latter, usually at a point adjacent the bottom of the reservoir. The bottom 24 of the dispensing chamber 16 is located at a point adjacent to, but above, the normal level of liquid in the reservoir 15. The measuring cups 17 are disposed in upright relation and have their upper ends 17a in open communication with the chamber 16. The cups preferably extend through the bottom 24 with the tops of the cups projecting a short distance thereabove and the main body of the cups extending in depending relation from such bottom.

The measuring cups 17 may be of any desired shape or form, and may have any desired volume or capacity depending upon the quantity of liquid to be charged into the containers 10. The upper ends of the cups can be extended any desired distance above the bottom 24. At their lower ends the cups are of convergent or funnel-like shape and have delivery openings or nozzles 25 for the downward discharge of the measured liquid. The lower ends of the cups are closed by means of movable closure means, preferably in the form of plugs or stoppers 26 made of rubber or other suitable material and carried by individual arms 27 mounted on rockable individual actuating shafts 28.

Figures 3, 7, 8, 9:
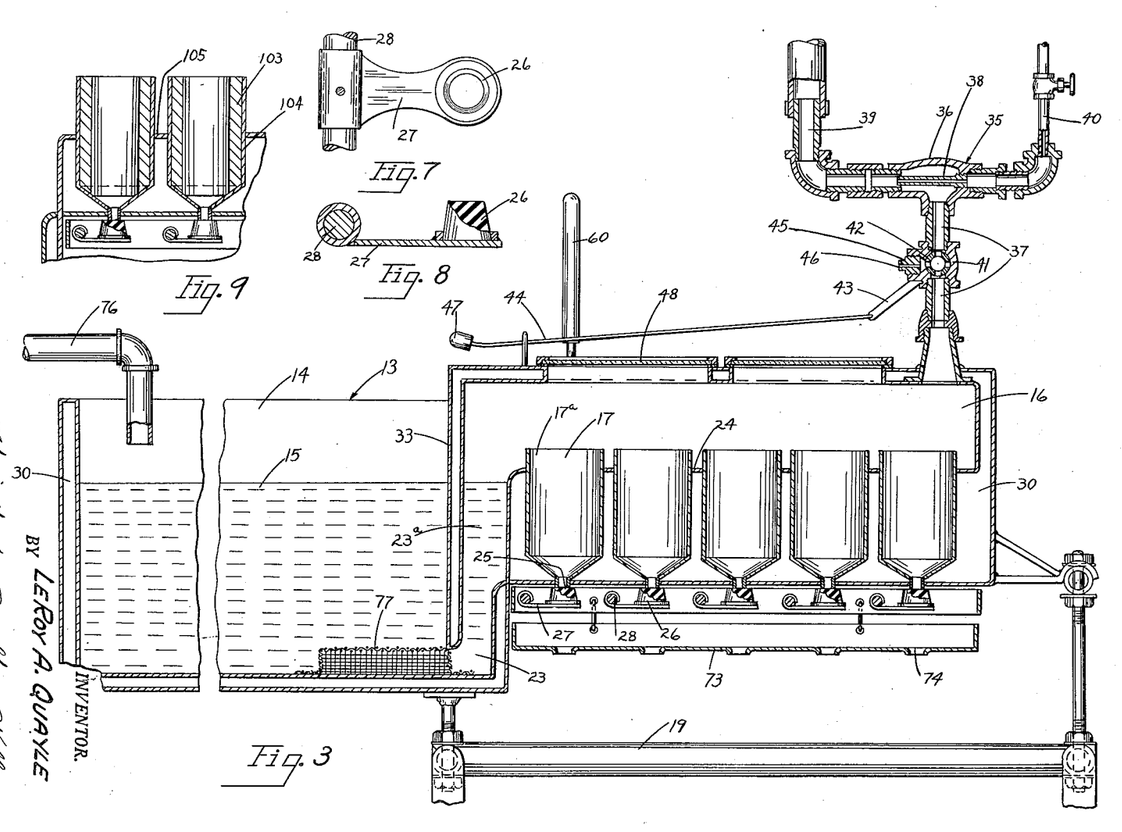
Fig. 3 is a partial longitudinal sectional view taken through the apparatus on line 3—3 of Fig. 2.
Fig. 7 is a detail plan view showing one of the movable closures for the delivery openings of the measuring cups.
Fig. 8 is a detail sectional view taken through such movable closure.
Fig. 9 is a partial vertical sectional view showing a modified form of measuring cup.

The tank 13 is preferably constructed with double walls so as to provide a space or jacket 30 through which a suitable heating or cooling medium can be circulated by means of pipes 31 and 32 for heating or cooling the liquid 15 to maintain the same at a desired temperature. As shown in Fig. 3, the space or jacket 30 also surrounds the dispensing chamber 16 and the measuring cups 17, and preferably also extends into the partition wall 33 located between the reservoir and dispensing chamber.

In the form of the invention shown in Figs. 1 to 4 the reservoir 14 is open to the atmosphere but the dispensing chamber 16 is closed to the atmosphere so that by reducing the pressure in the latter chamber a pressure differential can be created which will cause liquid to flow or surge from the reservoir into the dispensing chamber. Such flow of liquid takes place through the inlet 23 with the liquid traveling upwardly through the passage 23a and overflowing the bottom 24 of the dispensing chamber and the tops of the measuring cups 17 so as to run into and fill the latter. The liquid which flows into the dispensing chamber 16 is preferably in excess of that required to fill the cups 17 and upon restoration of the normal pressure condition in this chamber, the excess liquid drains from the bottom 24 and returns to the reservoir 15 leaving the measuring cups filled to their tops. As shown in the drawings, the inlet 23 provides a relatively short, direct passage connecting the dispensing chamber 16 with the reservoir 15 and is elongated laterally so as to have a lateral dimension which corresponds substantially with the width of the dispensing chamber. By making the inlet relatively short and of substantially the same width as the dispensing chamber, it will be seen that when the pressure differential is created between the reservoir and dispensing chamber the resulting flow of liquid takes place almost instantaneously and occurs as a sudden large volume flow or surge of liquid into the dispensing chamber and across the tops of the row of cups 17.

The pressure differential necessary to cause such a flow of liquid from the reservoir 15 into the dispensing chamber 16 can be obtained either by the use of pressure in the reservoir for forcing the liquid therefrom or by creating a partial vacuum in the dispensing chamber. The partial vacuum can be created by any suitable means such as the educting means 35 which is connected with the dispensing chamber for withdrawing air therefrom. The educting means 35 comprises a hollow body or fitting 36 which is connected with the dispensing chamber by a pipe 37 and has a nozzle or jet 38 therein. The nozzle 38 extends transversely of the connection or opening provided by the pipe 37 so that when compressed air or the like is discharged through the nozzle into the exhaust pipe 39, a suction or subatmospheric pressure will be created in the pipe 37 for withdrawing air from the chamber 16. The compressed air for the nozzle 38 may be supplied thereto by the pipe 40 which can be connected with any available source. A valve 41 located in the pipe 37 controls the connection between the educting means 35 and the dispensing chamber 16. This valve has a rotatable plug 42 therein which is adapted to be shifted to different positions, as will be presently explained, by means of an actuating lever 43 and an extension rod 44 connected with such lever. A screw plug 45 mounted in an opening of the body of the valve 41 has a passage therein forming an atmosphere connection 46.

When the measuring cups 17 are to be filled, the operator grasps the handle or knob 47 of the extension rod 44 and pushes the same to swing the lever 43, thereby shifting the valve plug 42 so as to bring the ports of the plug in line with the passage of the pipe 37 and thus connect the educting means 35 with the dispensing chamber 16. This same movement of the plug 42 causes the atmosphere connection 46 to be closed and this connection remains closed while the dispensing chamber 16 is being subjected to suction. The reduced pressure condition or partial vacuum thus created in the dispensing chamber causes a flow or surge of liquid thereinto as above explained.

It is desirable that the apparatus be provided with an indicating means for indicating when the measuring cups 17 have been filled with liquid and the excess liquid has been returned to the reservoir. One form of indicating means which is suitable for this purpose comprises transparent wall sections or windows 48 located in that portion of the tank which contains the dispensing chamber 16 and through which the measuring cups 17 can be observed from a point outside this chamber. In this instance, two such windows are shown in the top wall of the dispensing chamber 16 and located to overlie the row of measuring cups so that an operator standing adjacent the apparatus can look down into the dispensing chamber through these windows and can observe the filling and emptying of the cups 17. When the operator observes that the cups 17 have been filled as the result of the above described actuation of the plug 42 of the valve 41, the valve is shifted back to the position shown in Fig. 3, thereby disconnecting the educting means from the dispensing chamber and at the same time connecting this chamber with the atmosphere through the passage 46. This permits the restoration of atmospheric pressure in the chamber 16 whereupon the excess liquid drains from the bottom 24 of the dispensing chamber and flows back into the reservoir 15 through the inlet 23.

To prevent this return flow from taking place too rapidly, which might result in liquid being splashed or thrown about in the dispensing chamber, the atmosphere connection 46 is made of relatively restricted area, so that the restoration of pressure in the chamber 16 will be somewhat retarded. The size of the passage 46 will depend upon the character of the liquid being dispensed, the volume of the dispensing chamber and possibly other features of the apparatus. This passage is preferably formed in a screw plug 45, as mentioned above, so that the area of the passage can be varied by simply substituting a plug having a different sized passage therein.

Figure 4:
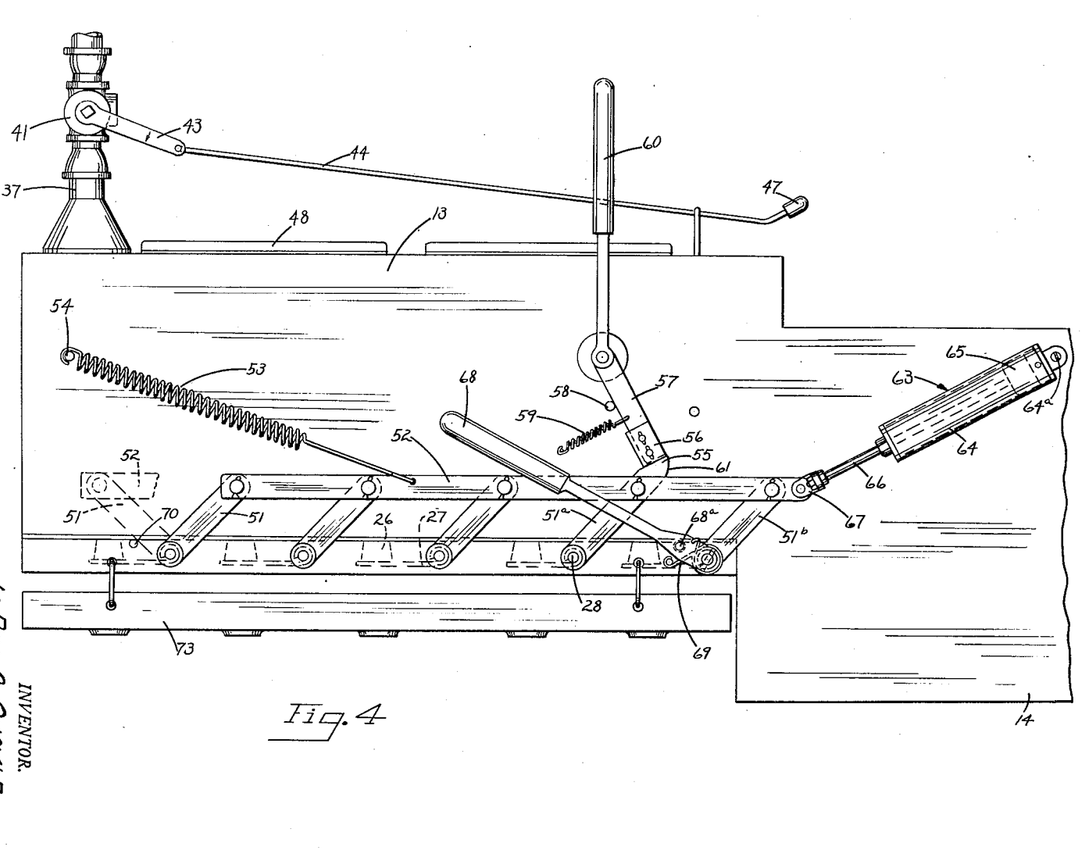
Fig. 4 is a partial side elevation on a somewhat larger scale and showing the means for controlling the filling and emptying of the measuring cups.

When the operator observes that the measuring cups 17 have been filled as above described and has permitted the excess liquid to flow back into the reservoir 15, the cups are emptied by permitting the measured liquid therein to flow out through the bottom openings 25 thereof. The discharge of liquid from the cups through the openings 25 is accomplished by actuating the shafts 28 substantially simultaneously to swing the arms 27, and the stoppers 26 carried thereby, to the open position. Fig. 4 shows one suitable form of mechanism for actuating the stoppers 26 to open and close the discharge openings 25 of the measuring cups.

This mechanism includes actuating arms 51 mounted on the individual rock shafts 28 and connected with a laterally movable actuating bar 52. A tension spring 53 having one end anchored on a pin 54 and its other end connected with the bar 52, constantly urges the latter toward the left as seen in Fig. 4 for swinging the stoppers to their open position. Such movement of the bar 52 is prevented by a latch which is formed by a lug or extension 55 on the closure actuating arm 51a and a latch member or stop 56 adapted to be engaged by such lug. The latch member 56 is carried by an actuating lever 57 which is normally held against a stop 58 by a tension spring 59. The lever 57 has an extension portion providing a handle 60 which can be swung in a counterclockwise direction as seen in Fig. 4, for disengaging the latch member 56 from the lug 55 to permit a quick opening of the stoppers by the action of the spring 53 in shifting the bar 52. The lug 55 has a rounded or beveled portion 61 enabling the same to be readily moved past the latch member 56 when the bar 52 is shifted back to the full-line position shown in Fig. 4 which corresponds with the closed condition of the stoppers 26.

To prevent the bar 52 from being actuated with a slamming or jarring action by the spring 53, a suitable check device 63 is preferably connected with one end of this bar. This check device may be of the type comprising a cylinder 64 pivoted at 64a and having a plunger 65 therein. A plunger rod 66 has its outer end connected with the bar 52 by means of a clip or lug 67 mounted on the latter. The check device 63 permits relatively free movements of the bar 52 toward the left as seen in Fig. 4 until the plunger 65 approaches the end of the cylinder from which the rod 66 extends, whereupon a checking or snubbing action is produced for slowing the rate of movement of the bar.

When the operator by looking through the windows 48, observes that the measuring cups 17 have been emptied, the stoppers 26 are shifted to their closed position to permit refilling of the cups. For moving the stoppers 26 to the closed position and at the same time resetting the actuating bar 52, I provide a lever 68 which is pivotally mounted so that by swinging the same in a clockwise direction as seen in Fig. 4, a pin 68a on such lever can be brought into engagement with the closure actuating arm 51b to thereby return the bar to the full line position shown in Fig. 4. This return movement of the bar 52 causes the lug 55 to move or wipe past the latch member 56, thereby resetting the latch mechanism, so as to retain the bar 52 in the position corresponding with the closed condition of the stoppers 26. A spiral spring 69 applied to the lever 68 normally holds the latter in an out-of-way position as shown in Fig. 4. A projecting pin 70 forms a stop which is located to be engaged by one of the arms 51 for limiting the opening movement of the actuating bar 52.

The liquid which is discharged from the measuring cups 17 flows therefrom in streams which will enter the containers 10 which have been previously located beneath the dispensing chamber 16. A funnel 72 or the like can be placed in the top of each container if desired to facilitate the flow of the liquid thereinto. A drip pan 73 is suspended beneath the dispensing chamber 16 and serves to catch liquid which drips from the closure plug 26 so as to prevent such liquid from dropping onto the sides of the containers or onto the floor. The drip pan 73 is provided with openings 74 of suitable size and location and through which the streams of liquid pass during the emptying of the cups 17. To facilitate the proper positioning of the wheeled truck 20 beneath the dispensing chamber 16, one or more pairs of guide rollers 75 may be provided on the frame 19 for guiding cooperation with the longitudinal side edges of the platform 20a of the truck.

The liquid in the reservoir 14 can be maintained at a desired level therein by delivering additional liquid into the reservoir either by means of buckets or the like, or through a supply pipe 76. When the liquid being dispensed is of a character such as to have lumps, clots or foreign bodies therein, it is desirable to provide a suitable screen 77 at the bottom of the reservoir so as to always be submerged in the liquid and such that the liquid flowing into the dispensing chamber 16 through the inlet 23 must pass through such screen. With the screen in this location it will be seen also that the return flow of excess liquid back into the reservoir as above described, causes self-cleaning of the screen.

Figure 5:
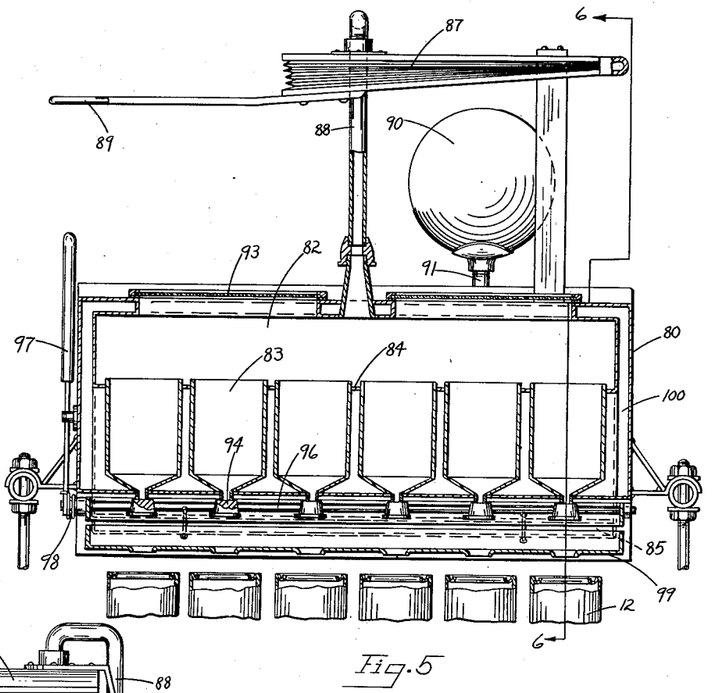
Fig. 5 is a partial longitudinal sectional view taken through a modified form of my dispensing apparatus.
Figure 6:
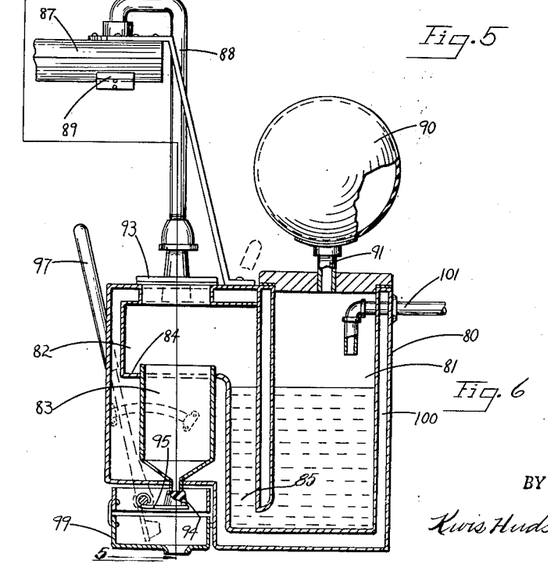
Fig. 6 is a partial transverse vertical sectional view taken through such modified apparatus as indicated by line 6—6 of Fig. 5.

In Figs. 5 and 6 I show a modified form of my dispensing apparatus and which, as mentioned above, can be used for filling cans 12 or the like with paint, lacquer or other coating material. This modified form of apparatus comprises a tank or housing 80 having therein a reservoir 81 and a dispensing chamber 82. A row or group of measuring cups 83 extends longitudinally of the dispensing chamber and which cups have their upper ends in open communication with this chamber by extending through the bottom 84 thereof.

To expedite the filling of the cups 83, the inlet 85 of the dispensing chamber 82 is located so that it is substantially coextensive with the row of cups. It will be seen also from the drawings that the reservoir 81 and the dispensing chamber 82 are substantially coextensive with each other and that the inlet passage 85 connects the dispensing chamber with the reservoir for substantially their full length. With this arrangement the flow or surge of liquid which rises up over the open ends of the cups in the dispensing chamber need travel only a short distance and will fill all of the cups substantially simultaneously.

When my dispensing apparatus is used in connection with coating materials as just mentioned above, it may be desirable to protect the liquid against contact with the atmosphere during the dispensing operation and, to this end, the reservoir 81 and the dispensing chamber 82 are both closed to the atmosphere and a quantity of suitable inert gas such as nitrogen is confined in the reservoir of the dispensing chamber under a moderate pressure. The liquid in the reservoir 81 is made to flow into the dispensing chamber 82 intermittently for filling the measuring cups 83. This is accomplished by reducing the pressure of the gas in the dispensing chamber 82 relative to the pressure existing in the reservoir 81 so that the gas pressure in the reservoir will force the liquid up into the dispensing chamber. The reduced pressure condition in the dispensing chamber can be obtained by withdrawing the inert gas, or a substantial portion thereof, from the dispensing chamber 82 by any suitable means such as an educting device or bellows 87 which is connected with the dispensing chamber by a pipe 88. The bellows 87 is of a suitable capacity to reduce the pressure in the dispensing chamber the necessary amount and may be provided with a handle 89 by which it can be manually expanded for withdrawing such gas from the dispensing chamber.

The pressure of the inert gas in the reservoir 81 can be maintained or substantially maintained during the dispensing operation by means of an expansible chamber device such as an elastic container or balloon 90 which is connected with the reservoir by means of a pipe 91. As the level of the liquid in the reservoir falls, additional gas will be supplied to the reservoir under moderate pressure by the balloon 90 and as the liquid level rises in the reservoir, some of the inert gas will be forced back into the balloon. The inert gas which is withdrawn from the dispensing chamber 82 by the bellows 87 is forced back into the dispensing chamber by collapsing the bellows as the operator, who is observing the measuring cups through the windows 93, sees that the cups have been filled. The restoration of the pressure condition in the dispensing chamber 82 allows the excess liquid to flow therefrom back into the reservoir.

As soon as the measuring cups 83 have been filled as above described and the excess liquid has been permitted to flow back into the reservoir 81, the measured liquid is discharged from the cups into the containers or cans 12 by swinging the stoppers 94 to their open position. The actuating means for these stoppers may comprise individual arms 95 upon which the stoppers are mounted and which are connected with a common actuating shaft 96. A lever 97 connected with the shaft 96 at one end thereof can be swung for rocking the shaft to cause opening and closing movements of the stoppers. A spiral spring 98 disposed around the shaft 96 and acting on the lever 97 urges the latter in a direction to hold the stoppers 94 in their closed position.

Figure 1:
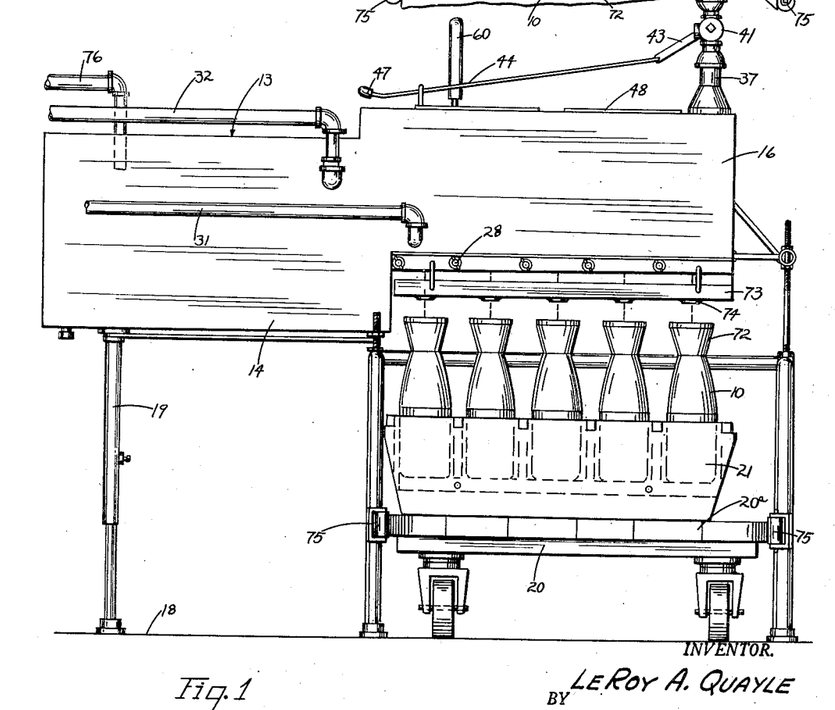
Fig. 1 is a side elevation showing one form of dispensing apparatus embodying the present invention.
Figure 2:
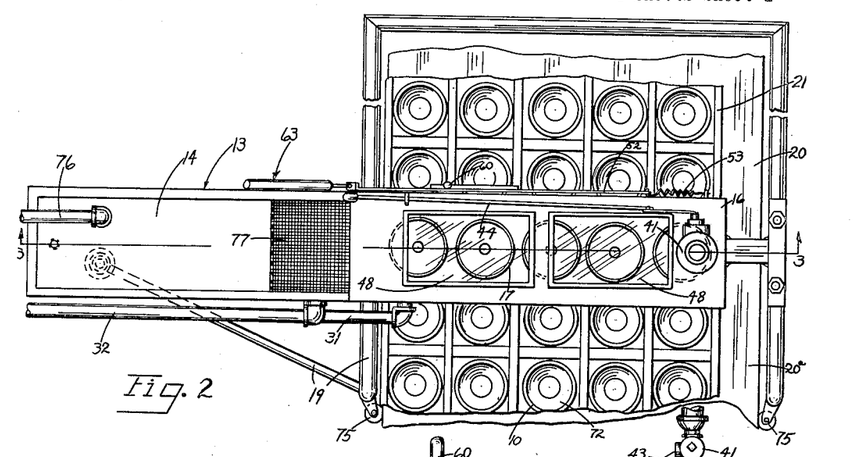
Fig. 2 is a plan view thereof.

The containers 12 may be supported beneath the dispensing chamber 82 by any suitable means such as by a conveyor or by a wheeled truck similar to that shown in Fig. 1. A drip pan 99 may also be provided beneath the dispensing chamber 82. The tank or housing 80 is preferably of a double-walled construction providing a space or jacket 100 which surrounds the reservoir, dispensing chamber and measuring cups and to which suitable heating or cooling medium can be applied for maintaining the liquid being dispensed at any desired temperature or degree of fluidity. The liquid in the reservoir 81 can be maintained at the desired level by supplying additional amounts to the reservoir through the pipe 101.

In Fig. 9, I show a liner or sleeve 103 being used in a dispensing cup 104 of the kind embodied in the dispensing apparatus above described. The sleeve or liner 103 is used in the cup when the apparatus is to be used for filling containers of a smaller size or volume than those for which the cup 104 is intended. The sleeve 103 reduces the initial volume of the cup 104 to a predetermined lesser volume.

In this modified construction of Fig. 9, the cups 103 are extended above the bottom 105 of the dispensing chamber a greater distance than the cups shown in Figs. 3 and 5. An advantage resulting from this is that there will be a greater volume of excess liquid to be returned to the reservoir after each filling of the cups which will cause an effective cleaning of the screen covering the inlet passage to the dispensing chamber and will also cause a desired agitation of the liquid in the reservoir.

From the foregoing description and the accompanying drawings it will now be readily understood that I have provided novel dispensing apparatus which can be used for measuring or dispensing various kinds of liquids and with which shells, cans or other containers can be filled or charged with predetermined volumes of the desired liquid in a rapid and satisfactory manner. It will be seen also that when the apparatus is to be used in dispensing paints or certain other liquids, it is susceptible of an embodiment in which an inert gas is used and protects the liquid from contact with the atmosphere. It will likewise be seen that by creating a reduced pressure condition or partial vacuum in the dispensing chamber, the liquid is effectively freed of bubbles containing entrapped air or gas.

While I have illustrated and described my novel dispensing apparatus in considerable detail, it will be understood, of course, that I do not wish to be correspondingly limited but regard my invention as including all changes and modification coming within the spirit of the invention and the scope of the appended claims.

Having thus described my invention, I claim:

1. A dispensing apparatus comprising, a tank having therein a reservoir adapted to contain a supply of liquid, a dispensing chamber in said tank laterally of the reservoir and in immediately contiguous relation thereto, said chamber being closed to atmosphere and having an inlet connected directly with said reservoir at a point below the normal level of liquid in the latter, said inlet having a lateral dimension approximately equal to the width of said chamber, a measuring cup connected with said chamber to receive liquid therefrom and having delivery means at its lower end, and means for creating a partial vacuum in said chamber for causing liquid to surge thereinto from said reservoir for filling said cup.

2. A dispensing apparatus comprising, a tank having therein a dispensing chamber and a reservoir in laterally contiguous relation to said chamber and adapted to contain a supply of liquid, said chamber being closed to atmosphere and having an inlet connecting the same directly with said reservoir at a point below the normal level of liquid in the latter, said inlet having a lateral dimension approximately equal to the width of said chamber, a measuring cup connected with said chamber to receive liquid therefrom and having delivery means at its lower end, eduction means connected with said chamber and operable to create a partial vacuum therein for causing liquid to surge into said chamber in excess of that required for filling said cup, and means for restoring the normal pressure in said chamber to permit the return of excess liquid to said reservoir.

3. A dispensing apparatus comprising, a tank having therein a dispensing chamber and a reservoir adapted to contain a supply of liquid, said chamber being closed to atmosphere and having an inlet connected with said reservoir at a point below the normal level of liquid in the latter and having its bottom located adjacent to, but above, said normal level; a measuring cup having its upper end in open communication with said chamber at a point above, but adjacent to, said bottom, means for creating a partial vacuum in said chamber for causing liquid to flow into said chamber from said reservoir in excess of that required for filling said cup; means for delivering the liquid from said cup, and means for retarding the restoration of normal pressure in said chamber for controlling the return of excess liquid to said reservoir.

4. In dispensing apparatus a tank having therein a pair of chambers closed to atmosphere one being a reservoir chamber adapted to contain a supply of liquid and the other being a dispensing chamber having an inlet connected with the reservoir chamber at a point below the normal level of liquid in the latter, a measuring cup having its upper end in open communication with said dispensing chamber and having means at its lower end for discharging measured liquid, a substantially inert gas confined in said chambers, and means for reducing the pressure of the gas in said dispensing chamber relative to the pressure of the gas in said reservoir chamber to cause liquid to flow from the latter into said dispensing chamber for filling said measuring cup.

5. In dispensing apparatus, a tank having therein a pair of chambers closed to atmosphere one being a reservoir chamber adapted to contain a supply of liquid and the other being a dispensing chamber having an inlet connected with the reservoir chamber at a point below the normal level of liquid in the latter, a measuring cup having its upper end in open communication with said dispensing chamber and having means at its lower end for discharging measured liquid, a substantially inert gas confined in said chambers, means for reducing the pressure of the gas in said dispensing chamber relative to the pressure of the gas in said reservoir chamber to cause liquid to flow from the latter into said dispensing chamber for filling said measuring cup, and an expansible chamber device connected with said reservoir chamber for keeping the latter supplied with said inert gas under pressure.

6. In dispensing apparatus, a tank having therein a reservoir adapted to contain a supply of liquid and a laterally elongated dispensing chamber closed to atmosphere, said reservoir and chamber being in laterally contiguous relation to each other and said chamber having an inlet at one end thereof connecting the chamber directly with said reservoir at a point below the normal level of the liquid in the latter, said inlet having a lateral dimension approximately equal to the width of said chamber, a plurality of measuring cups disposed in a row extending longitudinally of said dispensing chamber and having their upper ends in open communication therewith, means for reducing the pressure in said dispensing chamber so as to cause liquid to surge from said reservoir into said chamber and over the tops of said cups for filling the same, and means for discharging measured liquid from said cups.

7. In dispensing apparatus, a tank having therein a reservoir adapted to contain a supply of liquid and a dispensing chamber closed to atmosphere and having one side thereof adjacent to and substantially coextensive with said reservoir, a plurality of measuring cups disposed in a row extending generally parallel with said one side of said chamber and having their upper ends in open communication therewith, said chamber having an inlet substantially coextensive with said row of cups and connecting the chamber with said reservoir, means for reducing the pressure in said chamber so as to cause liquid to flow from said reservoir into said chamber transversely to said row of cups and over the tops thereof for filling the same, and means for discharging measured liquid from said cups.

8. In dispensing apparatus, a housing having in one portion thereof a reservoir adapted to contain a supply of liquid and a dispensing chamber in another portion thereof, said dispensing chamber being disposed laterally of said reservoir and in immediately contiguous relation thereto, means defining a direct and relatively short connecting passage in said housing between said dispensing chamber and reservoir and which passage communicates with the reservoir at a point below the normal liquid level thereof, said passage having a lateral dimension approximately equal to the width of said dispensing chamber and a cross-sectional area to permit a rapid surging flow of liquid from the reservoir into said dispensing chamber and a rapid return flow of excess liquid from the dispensing chamber to the reservoir, a plurality of measuring cups in said dispensing chamber and having their upper ends in open communication with the dispensing chamber and disposed at an elevation adjacent to but above said normal liquid level of the reservoir, means for causing such a surging flow of liquid through said passage from the reservoir into said dispensing chamber in excess of the volume required to fill the cups and for rapidly filling the said cups and discharge means at the lower ends of said cups for discharging measured liquid therefrom.

9. In dispensing apparatus, a housing having in one portion thereof a reservoir adapted to contain a supply of liquid and a dispensing chamber in another portion thereof, said dispensing chamber being closed to atmosphere and disposed laterally of said reservoir and in immediately contiguous relation thereto, means defining a direct and relatively short connecting passage in said housing between said dispensing chamber and reservoir and which passage communicates with the reservoir at a point below the normal liquid level thereof, said passage having a lateral dimension approximately equal to the width of said dispensing chamber and a cross-sectional area to permit a rapid surging flow of the liquid from the reservoir into said dispensing chamber and a rapid return flow of excess liquid from the dispensing chamber to the reservoir, a plurality of measuring cups in said dispensing chamber and having their upper ends in open communication with the dispensing chamber and disposed at an elevation adjacent to but above said normal liquid level of the reservoir, means for creating a partial vacuum in said dispensing chamber for causing such a surging flow of said liquid through said passage from the reservoir into said dispensing chamber in excess of the volume required to fill the cups and for rapidly filling the said cups, and discharge means at the lower ends of said cups for discharging measured liquid therefrom.

10. In dispensing apparatus, a housing having in one portion thereof a reservoir adapted to contain a supply of liquid and a dispensing chamber in another portion thereof, said dispensing chamber being disposed laterally of said reservoir and in immediately contiguous relation thereto, means defining a direct and relatively short connecting passage in said housing between said dispensing chamber and reservoir and which passage communicates with the reservoir at a point below the normal liquid level thereof, said passage having a lateral dimension approximately equal to the width of said dispensing chamber and a cross-sectional area to permit a rapid surging flow of liquid from the reservoir into said dispensing chamber and a rapid return flow of excess liquid from the dispensing chamber to the reservoir, said dispensing chamber having a bottom located adjacent to but above said normal liquid level of the reservoir, a plurality of measuring cups in said dispensing chamber and having their upper ends in open communication with the dispensing chamber at a point adjacent to but above said bottom, means for causing such a surging flow of liquid through said passage from the reservoir into said dispensing chamber in excess of the volume required to fill the cups and for rapidly filling the said cups, and discharge means at the lower ends of said cups for discharging the liquid therefrom.

11. In dispensing apparatus, a housing having in one portion thereof a reservoir adapted to contain a supply of liquid and a dispensing chamber in another portion thereof, said dispensing chamber being closed to atmosphere and disposed laterally of said reservoir and in immediately contiguous relation thereto, means defining a direct and relatively short connecting passage in said housing between said dispensing chamber and reservoir and which passage communicates with the reservoir at a point below the normal liquid level thereof, said passage having a lateral dimension approximately equal to the width of said dispensing chamber and a cross-sectional area to permit a rapid surging flow of liquid from the reservoir into said dispensing chamber and a rapid return flow of excess liquid from the dispensing chamber to the reservoir, said dispensing chamber having a bottom located adjacent to but above said normal liquid level of the reservoir, a plurality of measuring cups in said dispensing chamber and having their upper ends in open communication with the dispensing chamber at a point adjacent to but above said bottom, means for creating a partial vacuum in said dispensing chamber for causing such a surging flow of liquid through said passage from the reservoir into said dispensing chamber in excess of the volume required to fill the cups and for rapidly filling the said cups, and discharge means at the lower ends of said cups for discharging measured liquid therefrom.

12. In dispensing apparatus, means defining a reservoir chamber adapted to contain a supply of liquid, means defining a dispensing chamber, said dispensing chamber being disposed laterally of said reservoir chamber and in closely adjacent relation thereto, means defining a direct and relatively short connecting passage extending between and communicating with said reservoir and dispensing chambers adjacent the bottoms thereof, said passage having a cross-sectional area such as to permit a rapid surging flow of liquid from the reservoir chamber into the dispensing chamber and a rapid return flow of excess liquid from the dispensing chamber to the reservoir chamber, said reservoir chamber having a normal liquid level which is a substantial distance above the connection of said passage therewith, a plurality of measuring cups in said dispensing chamber and having their upper ends in open communication with the dispensing chamber and disposed at an elevation adjacent to but above said normal liquid level of the reservoir chamber, one of said chambers being closed to atmosphere and having gaseous medium therein, means for varying the pressure of said gaseous medium in said one chamber for causing said surging flow of liquid through said passage from the reservoir chamber in excess of the volume required to fill the cups into the dispensing chamber and to permit said rapid return flow of excess liquid to the reservoir chamber, and discharge means at the lower ends of said cups for discharging measured liquid from all of the cups substantially simultaneously.

13. In dispensing apparatus, means defining a reservoir chamber adapted to contain a supply of liquid, means defining a dispensing chamber, said dispensing chamber being disposed laterally of said reservoir chamber and in closely adjacent relation thereto, means defining a direct and relatively short connecting passage extending between and communicating with said reservoir and dispensing chambers adjacent the bottoms thereof, said passage having a cross-sectional area such as to permit a rapid surging flow of liquid from the reservoir chamber into the dispensing chamber and a rapid return flow of excess liquid from the dispensing chamber to the reservoir chamber, said reservoir chamber having a normal liquid level which is a substantial distance above the connection of said passage therewith, a plurality of measuring cups in said dispensing chamber and having their upper ends in open communication with the dispensing chamber and disposed at an elevation adjacent to but above said normal liquid level of the reservoir chamber, said dispensing chamber being closed to atmosphere and said reservoir chamber being open to atmosphere, means for partially exhausting gaseous medium from said dispensing chamber so as to decrease the pressure therein relative to the atmospheric pressure in said reservoir chamber for causing said surging flow of liquid through said passage from the reservoir chamber in excess of the volume required to fill the cups into the dispensing chamber, and discharge means at the lower ends of said cups for discharging measured liquid from all of the cups substantially simultaneously.

14. In dispensing apparatus, means defining a reservoir chamber adapted to contain a supply of liquid, means defining a dispensing chamber, said dispensing chamber being disposed laterally of said reservoir chamber and in closely adjacent relation thereto, means defining a direct and relatively short connecting passage extending between and communicating with said reservoir and dispensing chambers adjacent the bottoms thereof, said passage having a cross-sectional area such as to permit a rapid surging flow of liquid from the reservoir chamber into the dispensing chamber and a rapid return flow of excess liquid from the dispensing chamber to the reservoir chamber, said reservoir chamber having a normal liquid level which is a substantial distance above the connection of said passage therewith, a plurality of measuring cups in said dispensing chamber and having their upper ends in open communication with the dispensing chamber and disposed at an elevation adjacent to but above said normal liquid level of the reservoir chamber, said reservoir chamber and dispensing chamber being both closed to atmosphere and having gaseous medium therein, and means for varying the pressure of the gaseous medium in one chamber relative to the pressure in the other chamber for causing said surging flow of liquid through said passage from the reservoir chamber into the dispensing chamber in excess of the volume required to fill the cups and to permit said rapid return flow of excess liquid to the reservoir chamber, and discharge means at the lower ends of said cups for discharging the measured liquid from all of cups substantially simultaneously.

LE ROY A. QUAYLE.

REFERENCES CITED

The following references are of record in the file of this patent:

UNITED STATES PATENTS

| Number | Name | Date |
|---|---|---|
| 1,333,299 | Falkiner | Mar. 9, 1920 |
| 1,404,418 | Woodruff | Jan. 24, 1922 |
| 2,106,176 | Huffman et al. | Jan. 25, 1938 |
| 2,186,358 | Bonlich | Jan. 9, 1940 |